United States Patent [19]

Sakamoto et al.

[11] Patent Number: 5,206,773
[45] Date of Patent: Apr. 27, 1993

[54] MAGNETIC RECORDING DISK

[75] Inventors: Toyoko Sakamoto; Taizo Aizawa, both of Miyagi, Japan

[73] Assignee: Sony Corporation, Japan

[21] Appl. No.: 734,783

[22] Filed: Jul. 23, 1991

[30] Foreign Application Priority Data

Jul. 31, 1990 [JP] Japan .................................. 2-203066

[51] Int. Cl.$^5$ .............................................. G11B 5/82
[52] U.S. Cl. ................................... 360/135; 360/133
[58] Field of Search ................ 360/135, 133; 369/270, 369/271, 282

[56] References Cited

U.S. PATENT DOCUMENTS

| 1,915,348 | 6/1933 | Acheson | 365/282 |
|---|---|---|---|
| 4,459,628 | 7/1984 | Barton | 360/133 |
| 4,532,564 | 7/1985 | Larson | 360/133 |
| 4,630,156 | 12/1986 | Saito | 360/133 |
| 4,743,993 | 5/1988 | Ommori et al. | 360/133 |
| 5,014,152 | 5/1991 | Sasaki | 360/135 |

Primary Examiner—Bruce C. Anderson
Attorney, Agent, or Firm—Ronald P. Kananen

[57] ABSTRACT

A magnetic recording disk with a central hub including a core member having a central aperture, a ring member mounted on the core member, a covering member, a leaf spring and a pulse generating member. The ring member includes a recessed portion, a pair of slotted portions for accomodating the leaf spring and a pair of swelled portions extending inwardly toward the central aperture of the core member. The pulse generating member is connected to the core member and extends through the ring member in the direction perpendicular to the surface of the core member so that a tip end of the pulse generating member is projected outwardly from a bottom surface of the recessed portion. When a spindle of a disk driving mechanism is inserted into a central bore of the disk, the axis of a spindle is consistent with the center of rotation of a magnetic recording medium, retained by the combination of the leaf spring and the swelled portions.

3 Claims, 7 Drawing Sheets

MAGNETIC RECORDING DISK

BACKGROUND OF THE INVENTION

1. Field of the Invention

This invention relates to a magnetic recording disk employed as a recording medium for a magnetic recording apparatus such as an electronic still camera, particularly the present invention is directed to an improved central hub structure having a pulse generating member.

2. Description of the Background Art

Figure 7:
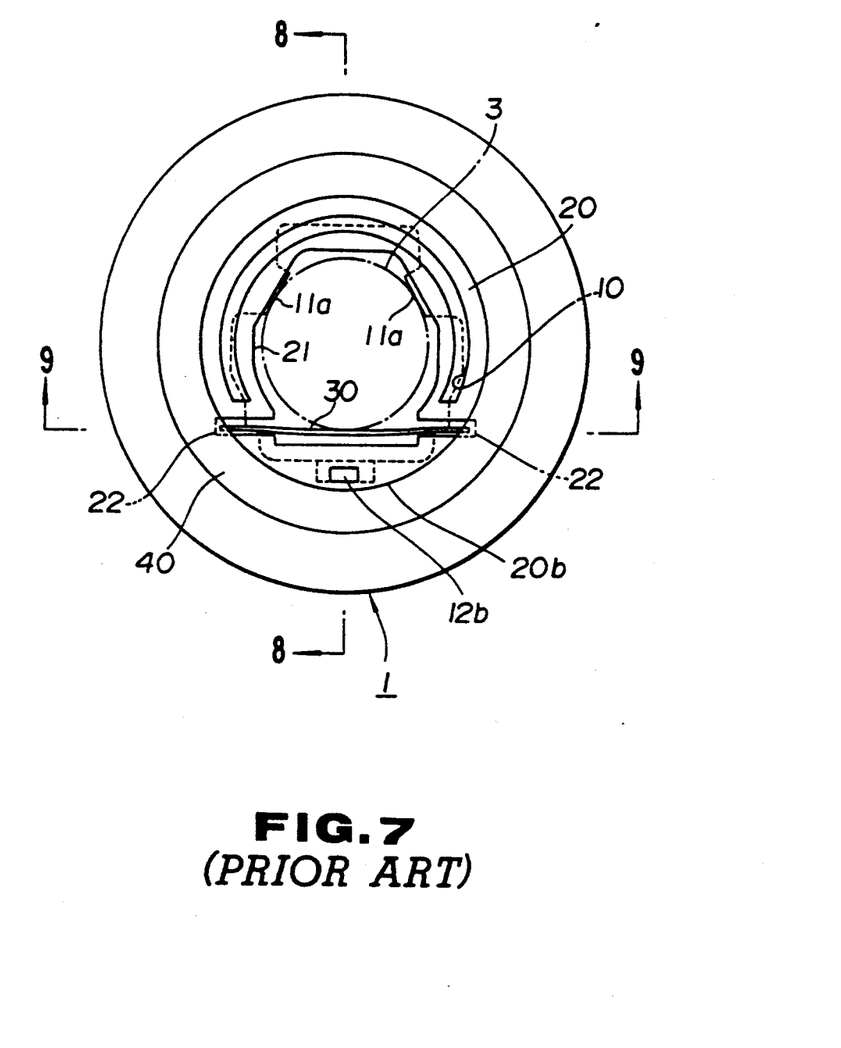
FIG. 7 is a plan view of a central hub of a conventional magnetic recording disk.
Figure 10:
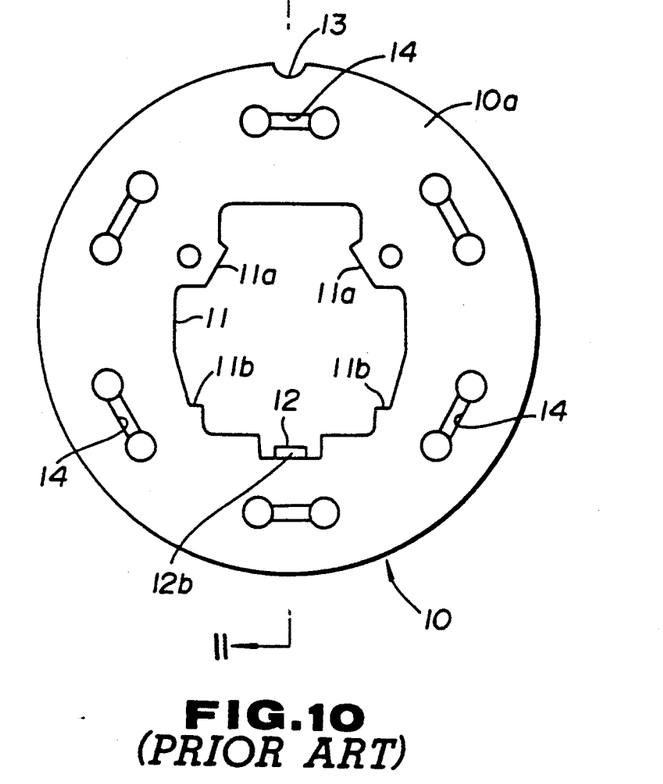
FIG. 10 is a plan view of a core member of the central hub shown in FIG. 7.
Figure 11:
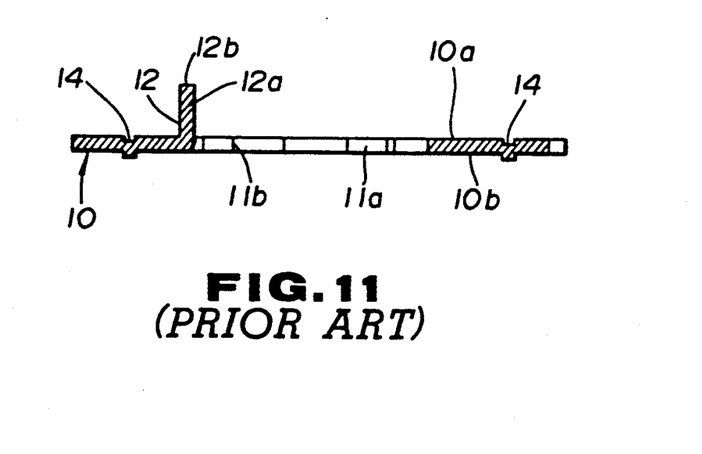
FIG. 11 is a cross-sectional view of the core member, taken along line F—F of FIG. 10.

A magnetic recording disk adapted to mount on an electronic still camera, which includes a magnetic recording medium and a central hub, is disclosed in Japanese laid-open patent publication No. 59-138063. FIGS. 7 to 15 illustrate such a conventional magnetic recording disk in which a magnetic recording medium 2 made of a flexible sheet material is retained on a central hub 1. Referring to FIG. 7, the central hub 1 includes a core member 10, a ring member 20, a leaf spring 30 and a covering member 40. The core member 10 having a central aperture 11 is formed by stamping a metal sheet made of soft iron and the like, as shown in FIG. 10. The ring member is made of synthetic resin and molded on the core member 10 so as to realize an integral hub body. The ring member 20 has a central aperture 21 which is approximately the same size as that of the core member 10. Both apertures of the core and ring members cooperate to form a center bore of the hub into which a spindle 3 of a disk driving mechanism is accomodated. On an inner periphery of the core member 10 are formed a pair of tapered portions 11a, 11a which are protruded inwardly into the aperture 11. A pair of shoulder portions 11b, 11b are also formed on the inner periphery to support the leaf spring 30. The core member 10 has a bent-up portion 12 which extends outwardly from the middle portion between the shoulder portions 11b, 11b in a direction perpendicular to a surface of the core member. A pulse generating portion which is a tip end 12a of the bent-up portion 12, is positioned opposed to a rotation detector (not shown in the drawings) of a disk driving mechanism. The rotation detector detects an amount of magnetic flux leak in a chucking magnet (not shown in the drawings) for the disk driving mechanism so that a rotational phase of the magnetic recording medium 2 is ascertained. A top face 12b of the pulse generating portion 12a is on the same plane as a top face 20b of the ring member 20.

In this case, the core member 10 is used as a yoke member which is attached to the chucking magnet. A notched portion 13 is provided at an outer peripheral edge of the core member 10 in order to keep a dynamic balance of rotating movement of the core member 10.

The aperture 21 of the ring member 20 has substantially a smaller diameter than that of the aperture 11 of the core member 10. As illustrated in FIGS. 12 to 14, at the tapered portions 11a, 11a which are protuberently formed on the inner periphery of the core member 10, the aperture 21 is larger in diameter than the aperture 11 of the core member 10. When the spindle 3 is inserted into the aperture 21, the leaf spring 30 supported on the shoulder portions 11b, 11b elastically biases the spindle 3 against the tapered portions 11a, 11a. As a result, the axis of the spindle 3 is consistent with the center of rotation of the magnetic recording medium 2. An inner peripheral surface 21a' of the ring member 20, which is in a lower position than the core member 10, is set flush with a distal end of the tapered portions 11a, 11a, as shown in FIG. 14. The spindle 3 is therefore protected from abrasion due to direct contact with edges of the tapered portions 11a, 11a, facilitating insertion and correct positioning of the spindle 3.

The ring member 20 is provided with a pair of slotted portions 22, 22. As illustrated in FIG. 12, each shoulder portion 11b of the core member 10 is positioned so as to project inwardly from an outside wall of each slotted portion 22 substantially up to the midway of the width of the slotted portion 22 to thereby assure that the leaf spring 30 being inserted is supported in the radial direction not by the outside wall of the slotted portion of the ring member 20 but by the shoulder portion of the core member 10. Moreover, the leaf spring 30 has a pair of tongue portions 30a, 30a which extend outwardly from both ends thereof and rest on the core member 10. This assures that the leaf spring is supported by the core member 10 in the axial direction of the spindle 3.

Figure 8:
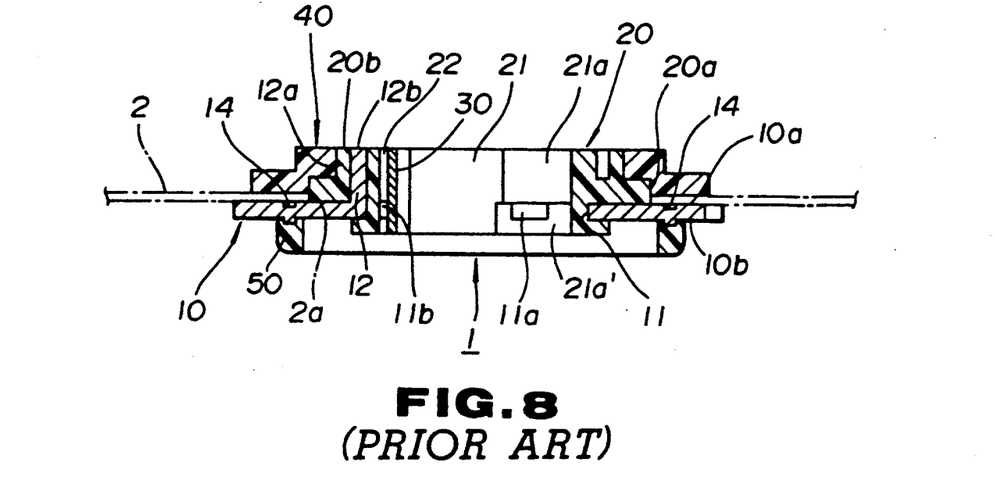
FIG. 8 is a cross-sectional view of the central hub of the conventional magnetic recording disk, taken along line D—D of FIG. 7.
Figure 9:
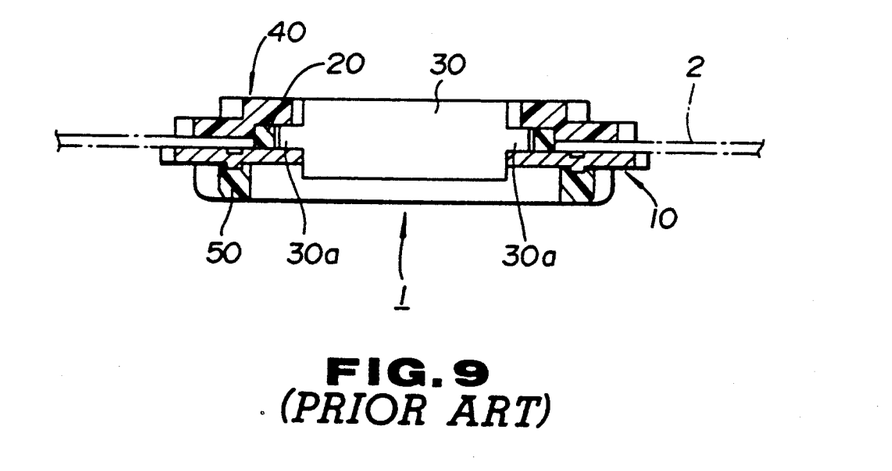
FIG. 9 is a cross-sectional view of the central hub shown in FIG. 7, taken along line E—E.

An outer diameter of the ring member 20 is consistent with an inner diameter of the magnetic recording medium 2. To this end, when assembled, an inner peripheral surface 2a of the magnetic recording medium 2 is snugly fitted over an outer peripheral surface 20a of the ring member 20. Upon molding of the ring member 20 on the core member 10, a rib member 50 is also molded along an outer peripheral portion of an underside 10b of the core member 10 as shown in FIG. 8. For the purpose of facilitating the molding of the rib member 50, a plurality of grooves 14 as illustrated in FIG. 10 are provided on an upper surface 10a of the core member 10.

In a process for manufacturing the central hub 1 for holding the magnetic recording medium 2, the leaf spring 30 is automatically inserted into the slotted portions 22, 22 of the ring members 20 after the ring member 20 is fixedly mounted on the core member 10. Subsequently, the magnetic recording medium 2 is fitted onto the outer peripheral surface 20a of the ring member 20 so that the under surface of the magnetic recording medium 2 closely contacts the upper surface 10a of the core member 10. The covering member 40 is fitted onto the outer peripheral surface 20a and then both members are attached to each other by high frequency welding whereby the magnetic recording medium 2 is retained between the covering member 40 and the core member 10. To this end, the magnetic recording disk with the central hub 1 as mentioned above is formed as an integrally configured body. Accordingly, the tongue portions 30a, 30a of the leaf spring 30 received in the slotted portions 22, 22 are covered with the covering member 40 so that the leaf spring 30 does not fall out therefrom. Such a magnetic recording disk with the central hub 1 is rotatably received in a housing of a flat box shape when used for example in a magnetic recording apparatus such as an electronic still camera.

As shown in FIG. 7, when the spindle 3 is inserted in the aperture 21 of the ring member 20, the spindle 3 is urged against the tapered portions 11a, 11a of the core member 10 by the biasing force of the leaf spring 30 located on the shoulder portions 11b, 11b. To this end, the spindle 3 is properly positioned such that the axis of the spindle 3 is consistent with the center of rotation of the magnetic recording medium 2. Further, in the magnetic recording disk with the central hub 1, a rotational phase of the magnetic recording medium 2 is determined by detecting a pulse generated by the top face 12b of the bent-up portion 12 which faces the rotation detector of the disk driving mechanism.

However, since the top face 20b of the ring member 20 is positioned on the same plane as the top face 12b of the core member 10 in the central hub 1 of the conventional magnetic recording disk as mentioned above, an area of the top face 12b may be undesirably reduced due to manufacturing inconsistencies or errors. Therefore, it is likely that the rotational phase of the magnetic recording medium 2 will not be accurately ascertained because the reduced area of the top face 12b induces decrease in an amount of pulse generation, making accurate detection thereof more difficult.

SUMMARY OF THE INVENTION

It is an object of the present invention to eliminate the above disadvantage and to provide a magnetic recording disk which can realize stable pulse generation for securely determining rotational phase of the magnetic recording medium.

In order to accomplish this object, there is provided a magnetic recording disk having a magnetic recording medium made of a flexible sheet-like material and a central hub having a central bore adapted for receiving a spindle of a disk driving mechanism. The central hub includes a core member made of a metal sheet which has a central aperture, and a ring member concentrically mounted on the core member. The ring member has a recessed portion provided on an outer surface thereof, a pair of slotted portions opposingly formed inside thereof, and a pair of swelled portions extending radially inwardly into the central aperture of the core member. Each of the slotted portions has a pair of opposite protrusions. The central hub also includes a covering member mounted over an outer surface of the ring member so that the magnetic recording medium is retained between the covering member and the core member. Further, the central hub includes a leaf spring having a pair of tongue portions extending outwardly from its both ends, a pair of notched portions at its lower end, and a folded portion extending between the notched portions. The leaf spring is mounted into the slotted portions such that each end of the leaf spring is interposed between the opposing protrusions in each of the slotted portions. In addition, a pulse generating member is fixedly connected to the core member and extends through the ring member in a direction perpendicular to a surface of the core member so that a tip end of the pulse generating member is projected outwardly from a bottom surface of the recessed portion.

BRIEF DESCRIPTION OF THE DRAWINGS

FIG. 12 is a plan view illustrating a ring member fixedly mounted on the core member shown in FIG. 10;

FIG. 13 is a cross-sectional view of the conventional ring member, taken along line G—G of FIG. 12;

FIG. 14 is a cross-sectional view of the conventional ring member, taken along line H—H of FIG. 12; and FIG. 15 is a front view of a leaf spring for the central hub of a conventional magnetic recording disk.

DESCRIPTION OF THE PREFERRED EMBODIMENT

The preferred embodiment of a magnetic recording disk according to the present invention will now be described with reference to the accompanying drawings in which like reference remarks are employed to indicate like parts of the conventional magnetic recording disk described above and therefore detailed explanations thereof are omitted hereinafter.

Figure 1:
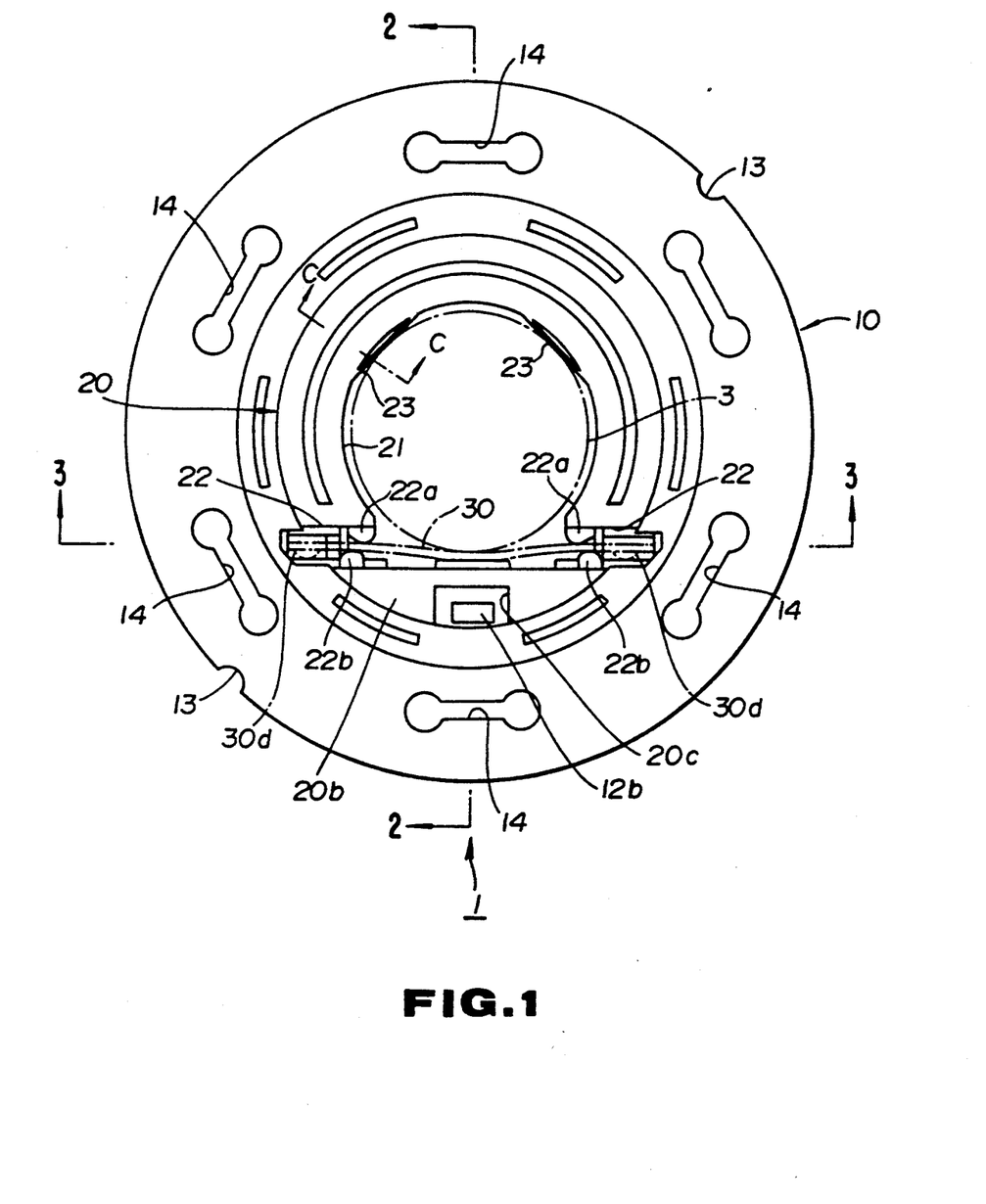
FIG. 1 is a plan view of one embodiment of a central hub of a magnetic recording disk according to the present invention.
Figure 2:
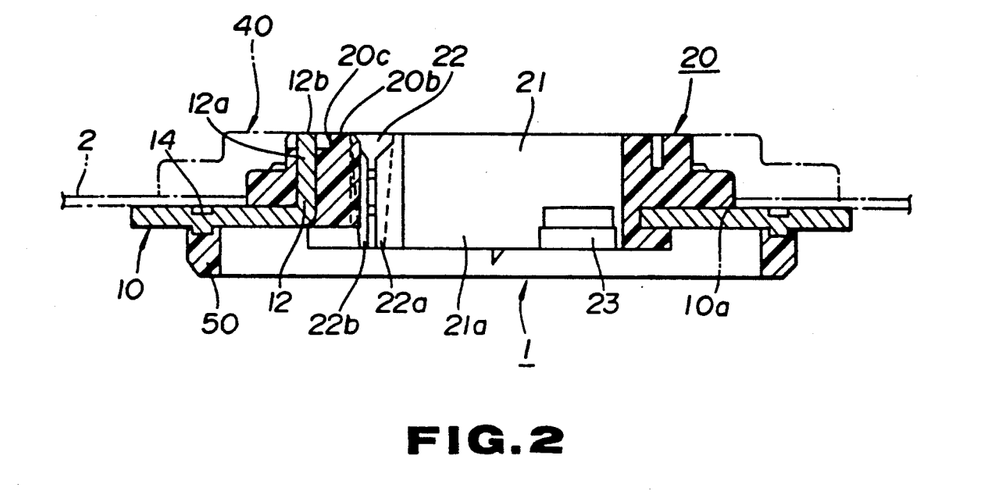
FIG. 2 is a cross-sectional view of the central hub, taken along line A—A of FIG. 1.
Figure 3:
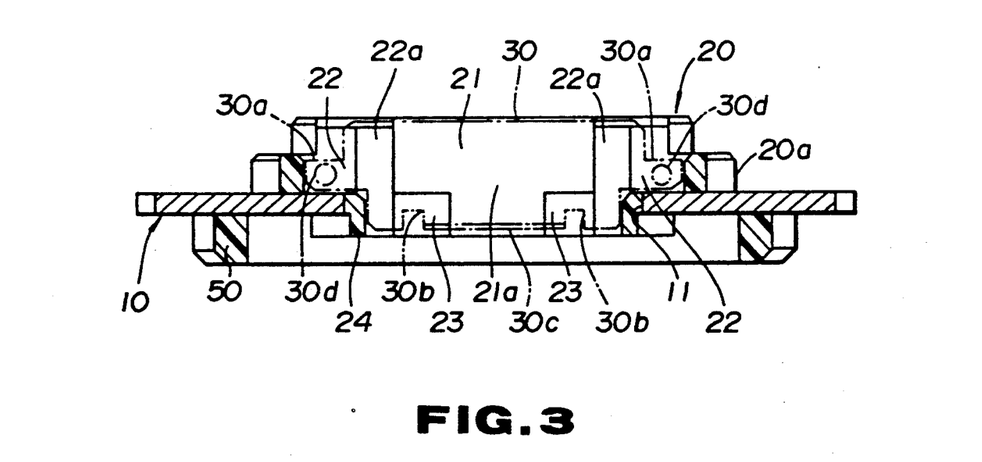
FIG. 3 is a cross-sectional view of the central hub, taken along line B—B of FIG. 1.

Referring to FIGS. 1 to 3, a central hub 1 includes a core member 10 made of sheet metal, a ring member 20 made of synthetic resin, a leaf spring 30, a covering member 40 made of synthetic resin and a rib member 50 made of synthetic resin. The core member 10 is of an annular shape having a central aperture 11. The ring member 20 is molded on an inner peripheral portion of the core member 10 so as to be integrally combined with the core member 10. Thus formed ring member 20 has a central aperture 21. Both apertures 11 and 21 cooperate to form a center bore of the hub in which a spindle 3 of a disk driving mechanism is received. The leaf spring 30 is located at a given position of the inner peripheral portion of the ring member 20 and biases the spindle 3 such that the axis of the spindle 3 is consistent with the center of rotation of the magnetic recording medium 2. The covering member 40 is fitted on an outer peripheral surface 20a of the ring member 20 so that the magnetic recording medium 2 is interposed between the covering member 40 and an upper surface 10a of the core member 10. The rib member 50 is formed along an outer peripheral portion of an underside 10b of the core member 10 using conventional molding methods. As far as such components are concerned, the central hub 1 of the magnetic recording disk according to the invention is essentially the same as the conventional one.

In the aforementioned structure of the central hub of the magnetic recording disk according to the invention, as illustrated in FIGS. 1 and 2, the ring member 20 is provided with a recessed portion 20c on its top face 20b which is opposed to a rotation detector of a disk driving mechanism (not shown in the drawings). The recessed portion 20c is located around a pulse generating portion 12a extending from the core member 10. Accordingly, a distal end 12b of the pulse generating portion 12a is completely projected outwardly from a bottom surface of the recessed portion 20c so that a pulse generated from the distal end 12b is securely detected by the rotation detector irregardless of production accuracy in the manufacture of the distal end 12b.

Figure 4:
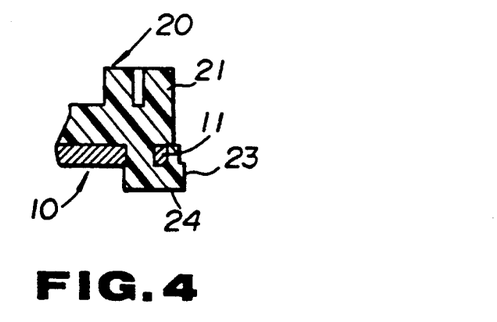
FIG. 4 is a cross-sectional view of the central hub, taken along line C—C of FIG. 1.

Further, while the central hub of the conventional magnetic recording disk includes a pair of tapered portions 11a, 11a projectingly formed on the inner peripheral surface of the core member 10, the central hub of the magnetic recording disk according to the invention includes a pair of swelled portions 23, 23, as shown in FIG. 4, which are formed at lower parts of its inner peripheral portion 21a of the ring member 20 so as to be spaced apart from each other. As illustrated in FIGS. 3 and 4, the inner peripheral portion of the core member 10 is as a whole covered with a lower part 24 of the ring member 20. To this end, the spindle 3 is completely prevented from abrasion of its outer surface when inserted in the aperture 21 of the ring member 20.

Figure 5:
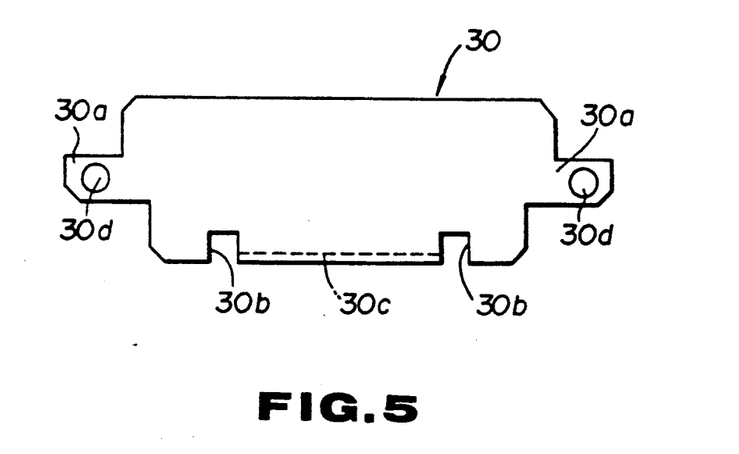
FIG. 5 is a plan view of a leaf spring for the central hub.

In addition, the leaf spring 30 is of a shape as illustrated in FIG. 5 and formed by stamping a metal sheet. The leaf spring 30 is provided, on each end thereof, with a pair of tongue portions 30a, 30a which are inserted in a pair of slotted portions 22, 22 formed on the ring member 20. Each of the slotted portions 22, 22, has a pair of protrusions 22a, 22b which are opposite each other so as to interpose the leaf spring 30 therebetween. The leaf spring 30 is supportingly retained between the protrusions 22a, 22b and elastically biases the spindle 3 against the swelled portions 23, 23.

Figure 6:
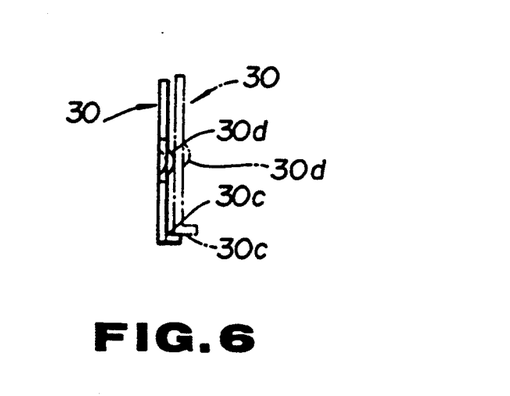
FIG. 6 is a side view of the leaf spring shown in FIG. 5.

Further, the leaf spring 30 is provided on its lower portion, with a pair of notches 30b, 30b. The lowermost part of the leaf spring 30, which extends between the notches 30b, 30b, is perpendicularly folded so as to form a folded portion 30c. A pair of projecting portions 30d, 30d are provided at the approximate center of each tongue portion 30a by metal working process such as press-forming. The projecting portions 30d, 30d are of hemispherical shape, and are formed on one side face of the leaf spring 30 on which the folded portion 30c is also provided. Referring to FIG. 6, in manufacturing process, the leaf spring 30 is supplied completely spaced apart from adjacent leaf springs due to the existence of the projecting portions 30d, 30d in cooperation with the folded portion 30c. The slotted portions 22, 22 formed in the central hub 1 of the magnetic recording disk according to the invention are covered with the covering member 40 in the same manner as in the conventional disk so that the leaf spring 30 is prevented from becoming dislodged from the slotted portions 22, 22. Moreover, according to the invention, the projecting portions 30d, 30d of the leaf spring 30 are located outside of the protrusions 22a, 22b, which serve as a deflecting points of the leaf spring 30. Therefore, the projecting portions 30d, 30d have no influence on the rigidity and strength of the leaf spring 30 when used. In addition, such a leaf spring is easily manufactured by conventional press molding without need for significantly changing or modifying the process.

As mentioned above, provision of the projecting portions 30d, 30d and folded portion 30c considerably facilitates automatic assembly processes for magnetic recording disks according to the present invention, as the leaf spring 30 is held is place within the slotted portions 22, 22. Namely, since the leaf spring 30 for the magnetic recording disk according to the invention is provided on its both ends with a projecting portion 30d formed on each of the tongue portions 30a, respective leaf springs 30, 30 may be separately supplied to an automatic disk assembly line as shown in FIG. 6, even when the leaf springs 30, 30 are stacked close to each other in an overlapped manner. The overlapped leaf springs 30, 30 are separated before being inserted into the slotted portions 22, 22 one by one. Accordingly, use of the leaf spring having the aforementioned specific structure and configuration eliminates the possibility of inserting two or more overlapped leaf springs into the slotted portions, which often occurs during conventional automatic assembly of magnetic recording disks.

Although the projecting portion 30d is integrally formed on the leaf spring 30 in the aforementioned preferred embodiment of the magnetic recording disk according to the invention, another separate member may be fixed thereon by an adhesive so as to be usable as the projecting portion 30d. Further, a separate pulse generating member which is formed separately from the core member 10 may be secured in the recessed portion 20c of the ring member 20.

As is obvious from the aforementioned description of the preferred embodiment of the invention, the pulse generating portion of the magnetic recording disk is projected from the bottom surface of the recessed portion formed on the top face of the ring member which is opposed to the rotation detector of the disk drive mechanism, resulting in accurate and stable detection of a pulse generated from the pulse generating portion. To this end, a rotational phase of the magnetic recording disk is securely determined and a magnetic recording disk with high fidelity and accuracy can be realized.

What is claimed is:

1. A magnetic recording disk comprising a magnetic recording medium made of a flexible sheet-like material and a central hub having a central bore adapted for receiving a spindle of a disk driving mechanism, said central hub comprising:

a core member being made of a metal sheet and having a central aperture;

a ring member concentrically mounted on said core member and having a recessed portion provided on an outer surface thereof, a pair of slotted portions opposingly formed inside thereof and a pair of swelled portions extending radially inwardly into said central apperture of said core member; said pair of slotted portions each having a pair of opposite protrusions;

a covering member mounted over an outer surface of said ring member so that said magnetic recording medium is retained between the covering member and said core member;

a leaf spring having a pair of tongue portions extending outwardly from both ends thereof, a pair of notched portions at a lower side thereof and a folded portion extending between said pair of notched portions; said leaf spring being insertedly mounted into said pair of slotted portions such that each end of the leaf spring is interposed between said pair of opposite protrusions in each of said slotted portions;

a pulse generating member fixedly connected to said core member and extending through said ring member in a direction perpendicular to the surface of said core member so that a tip end of the pulse generating member is projected outwardly from a bottom surface of said recessed portion.

2. The magnetic recording disk according to claim 1, wherein said pulse generating member is a one-piece member formed by stamping.

3. The magnetic recording disk according to claim 1, wherein said pulse generating member is formed separately from said core member and welded onto said core member.

* * * * *